US011907951B2

United States Patent
Okazaki et al.

(10) Patent No.: US 11,907,951 B2
(45) Date of Patent: Feb. 20, 2024

(54) SERVER, WALLET SYSTEM, COMPUTER READABLE RECORDING MEDIUM, AND NOTIFICATION METHOD

(71) Applicant: TOYOTA JIDOSHA KABUSHIKI KAISHA, Toyota (JP)

(72) Inventors: Kenji Okazaki, Toyota (JP); Masato Endo, Tokyo-to (JP); Mayumi Kurita, Tokyo-to (JP); Masashi Toritani, Tokyo-to (JP); Kumiko Matsuura, Tokyo-to (JP); Takayuki Shikoda, Tokyo-to (JP); Masaaki Otsuka, Kawasaki (JP); Yoshikazu Ishii, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 149 days.

(21) Appl. No.: 17/211,326

(22) Filed: Mar. 24, 2021

(65) Prior Publication Data
US 2021/0334810 A1    Oct. 28, 2021

(30) Foreign Application Priority Data
Apr. 22, 2020    (JP) ................. 2020-076225

(51) Int. Cl.
*G06Q 20/40* (2012.01)
*G06Q 20/30* (2012.01)
*G06Q 20/20* (2012.01)

(52) U.S. Cl.
CPC ......... *G06Q 20/4015* (2020.05); *G06Q 20/20* (2013.01); *G06Q 20/30* (2013.01)

(58) Field of Classification Search
CPC .... G06Q 20/4015; G06Q 20/20; G06Q 20/30; G06Q 20/204; G06Q 20/363; G06Q 20/4014; G06Q 20/3276; G06Q 20/367
See application file for complete search history.

(56) References Cited

U.S. PATENT DOCUMENTS

| 6,061,057 A * | 5/2000 | Knowlton .......... G06Q 30/0641 715/744 |
| 2005/0203802 A1 | 9/2005 | Suzuki et al. |

(Continued)

FOREIGN PATENT DOCUMENTS

| JP | 2004-213363 A | 7/2004 |
| JP | 2014-044719 A | 3/2014 |

(Continued)

OTHER PUBLICATIONS

"Mobile Payments: What's in It for Consumers?", Fumiko Hayashi, Jan. 2012, Economic Review, Federal Reserve Bank of Kansas City, vol. 97 (Q I), pp. 35-66 (Year: 2012).*

(Continued)

*Primary Examiner* — Duan Zhang
(74) *Attorney, Agent, or Firm* — Oliff PLC

(57) ABSTRACT

A server includes a processor including hardware, the processor being configured to: acquire store position information of a store where a user has entered; acquire store information in which position information of each of a plurality of stores and one or more settlement methods available in each of the plurality of stores are associated; and notify a terminal owned by the user of the settlement method available in the store where the user has entered based on the store position information and the store information.

14 Claims, 4 Drawing Sheets

(56) References Cited

U.S. PATENT DOCUMENTS

| | | | |
|---|---|---|---|
| 2009/0192913 A1* | 7/2009 | Saito | G06Q 20/3572 705/26.1 |
| 2012/0209749 A1* | 8/2012 | Hammad | G06Q 20/326 705/27.1 |
| 2014/0122328 A1* | 5/2014 | Grigg | G06Q 20/384 705/40 |
| 2015/0161638 A1* | 6/2015 | Chapman, Jr. | G07F 17/3237 705/14.12 |
| 2016/0055512 A1* | 2/2016 | Godsey | G06Q 20/325 705/14.27 |
| 2017/0278096 A1* | 9/2017 | Chitalia | G06Q 20/20 |
| 2019/0080332 A1 | 3/2019 | MacKinnon | |
| 2021/0312423 A1 | 10/2021 | Sekiya et al. | |
| 2021/0334788 A1 | 10/2021 | Okazaki et al. | |
| 2022/0027979 A1* | 1/2022 | Bruno | G06Q 30/0631 |

FOREIGN PATENT DOCUMENTS

| | | | |
|---|---|---|---|
| JP | 2016-062376 A | | 4/2016 |
| JP | 2019-003508 A | | 1/2019 |
| JP | 2019003508 A | * | 1/2019 |
| JP | 2019-128781 A | | 8/2019 |
| JP | 2020-021219 A | | 2/2020 |
| JP | 2020-021267 A | | 2/2020 |
| WO | 2018/043015 A1 | | 3/2018 |
| WO | 2019/230986 A1 | | 12/2019 |

OTHER PUBLICATIONS

Jul. 26, 2022 Office Action issued in U.S. Appl. No. 17/215,041.

\* cited by examiner

SERVER, WALLET SYSTEM, COMPUTER READABLE RECORDING MEDIUM, AND NOTIFICATION METHOD

The present application claims priority to and incorporates by reference the entire contents of Japanese Patent Application No. 2020-076225 filed in Japan on Apr. 22, 2020.

BACKGROUND

The present disclosure relates to a server, a wallet system, a computer readable recording medium, and a notification method.

In JP 2019-128781 A, settlement processing for a payment amount is performed by electronic settlement with the highest priority set in advance by a user, and when the payment amount cannot be fully settled, settlement processing for a remaining amount is performed by electronic settlement with the next highest priority.

SUMMARY

Incidentally, when performing electronic settlement in a store, a user performs settlement while confirming electronic settlement available in the store every time. For this reason, users have desired a technology that allows the users to grasp electronic settlement available in stores.

There is a need for a server, a wallet system, a computer readable recording medium, and a notification method, by which electronic settlement available in a store may be grasped.

According to one aspect of the present disclosure, there is provided a server including a processor including hardware, the processor being configured to: acquire store position information of a store where a user has entered; acquire store information in which position information of each of a plurality of stores and one or more settlement methods available in each of the plurality of stores are associated; and notify a terminal owned by the user of the settlement method available in the store where the user has entered based on the store position information and the store information.

DETAILED DESCRIPTION

Hereinafter, a wallet system including a store terminal according to an embodiment of the present disclosure will be described with reference to the drawings. Note that the present disclosure is not limited by the embodiment described below.

Figure 1:
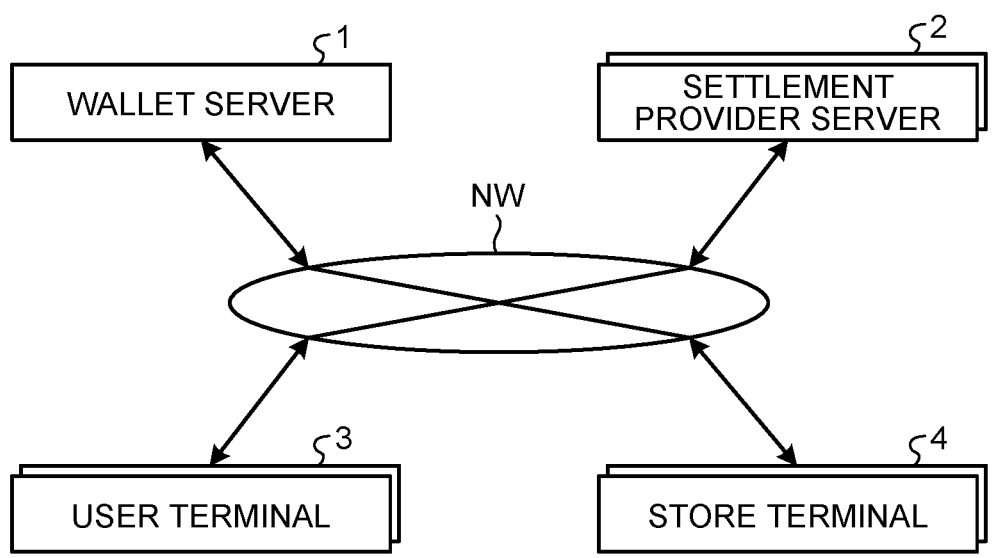
FIG. 1 is a diagram schematically illustrating a configuration of a wallet system according to an embodiment.
Figure 2:
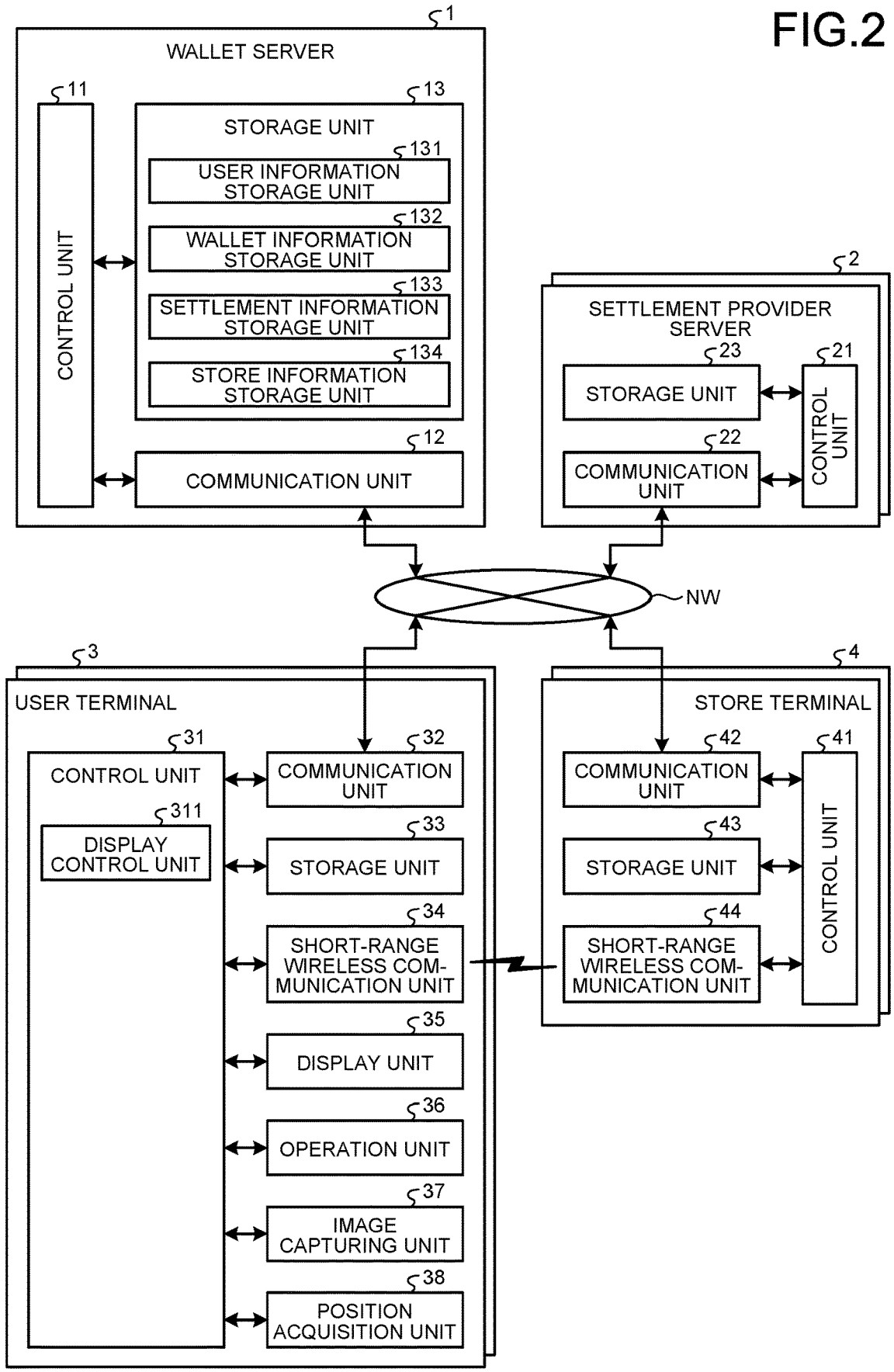
FIG. 2 is a block diagram illustrating details of each component of the wallet system according to the embodiment.

FIG. 1 is a diagram schematically illustrating a configuration of the wallet system according to the embodiment. FIG. 2 is a block diagram illustrating details of each component of the wallet system according to the embodiment. A wallet system 100 illustrated in FIGS. 1 and 2 includes a wallet server 1, a settlement provider server 2, a user terminal 3, and a store terminal 4. In the wallet system 100, the wallet server 1, the settlement provider server 2, the user terminal 3, the store terminal 4, and the point server 5 are able to communicate with each other through a network NW. The network NW includes, for example, an internet line network and a mobile phone line network.

First, a configuration of the wallet server 1 will be described. The wallet server 1 is a server for comprehensively managing the wallet system 100. The wallet server 1 includes a control unit 11 (second processor), a communication unit 12, and a storage unit 13.

The control unit 11 controls each unit that constitutes the wallet server 1. The control unit 11 includes a processor having hardware, such as a central processing unit (CPU) and a field-programmable gate array (FPGA), and a memory (main storage unit) including a random access memory (RAM) and a read only memory (ROM). The control unit 11 loads a program stored in the storage unit 13 into a work area of the main storage unit, executes the program, and controls each unit through the execution of the program.

The communication unit 12 is connected to the network NW such as the Internet serving as a public communication network, and communicates with each of the settlement provider server 2, the user terminal 3, and the store terminal 4 via the network NW. The communication unit 12 is implemented by using, for example, a local area network (LAN) interface board or a wireless communication circuit for wireless communication.

The storage unit 13 stores various programs executed by the wallet server 1. The storage unit 13 is implemented by using a hard disk drive (HDD), a solid state drive (SSD), and the like. In addition, the storage unit 13 includes a user information storage unit 131 for each user using the wallet system 100, a wallet information storage unit 132, a settlement information storage unit 133, and a store information storage unit 134 (memory).

The user information storage unit 131 stores user information regarding a user who uses the wallet system 100. Examples of the user information includes a user ID of the user who has registered to use the wallet system 100, a password, a name of the user, contact information (for example, address, phone number, and email address) of the user, terminal information (IP address) of the user, a use registration history, information regarding a payment method registered as a depositing method, registration information indicating a plurality of settlement methods (names of settlement applications) registered as settlement methods of the user terminal 3, and a personal identification number at the time of settlement. Note that, in the user information storage unit 131, the user ID and the password are used for authentication processing such as login to the wallet server 1.

The wallet information storage unit 132 stores wallet information regarding a wallet of the wallet system 100. The wallet information is a virtual deposit/withdrawal account of electronic money. Specifically, examples of the wallet information include a user ID, a balance of electronic money, a deposit history of electronic money, and a use history of electronic money.

The settlement information storage unit 133 stores settlement information regarding settlement of the wallet system 100. The settlement information includes a user ID, a settlement method used for settlement (for example, electronic money payment (contactless payment), scan payment, and code payment), and a settlement history.

The store information storage unit 134 stores store information in which position information of each of a plurality of stores and one or more settlement methods available in each of the plurality of stores are associated. Note that the store information storage unit 134 may store a store name, a business type (for example, a convenience store and a general store), a phone number, and the like in addition to the position information (address) of a store.

Next, a configuration of the settlement provider server 2 will be described. The settlement provider server 2 is a server for managing an account and a credit card of the user. The settlement provider server 2 is provided in a financial institution (for example, a bank, a credit union, a credit association, and a labor bank) and a credit card company. The settlement provider server 2 includes a control unit 21, a communication unit 22, and a storage unit 23. Since the control unit 21, the communication unit 22, and the storage unit 23 have functions similar to those of the control unit 11, the communication unit 12, and the storage unit 13, detailed description thereof will be omitted.

The storage unit 23 stores account information and credit card information, for each user of the wallet system 100. Examples of the account information include a name of the user, an account number, an account balance, and a deposit/withdrawal history. In addition, examples of the credit card information include a name of the user, a credit card number, an expiration date of the credit card, use limit amount, and a card use history.

Next, a configuration of the user terminal 3 will be described. Examples of the user terminal 3 include a smartphone, a mobile phone, a tablet terminal, a wearable computer, a personal computer, and a car navigation system mounted on a vehicle, which are owned by the user. The user terminal 3 may be any terminal as long as information may exchanged with the wallet server 1.

The user terminal 3 includes a control unit 31 (first processor), a communication unit 32, a storage unit 33, a short-range wireless communication unit 34, a display unit 35 (display), an operation unit 36, an image capturing unit 37, and a position acquisition unit 38. Since the communication unit 32 has a function similar to that of the communication unit 12, detailed description thereof will be omitted.

The control unit 31 controls each unit that constitutes the user terminal 3. The control unit 31 includes a processor having hardware, such as a CPU and a DSP, and a memory (main storage unit) including a RAM and a ROM. The control unit 31 loads a program stored in the storage unit 33 into a work area of the main storage unit, executes the program, and controls each unit through the execution of the program. The control unit 31 functions as a display control unit 311 through the execution of the program.

The display control unit 311 controls display contents on the display unit 35. Based on operation of the user (touch operation, slide operation, pinch operation, flick operation, and the like) for the operation unit 36, the display control unit 311 displays, on the display unit 35, a member registration screen for the user to register as a member, a login screen for the user to log in to the wallet system 100, a depositing screen for the user to deposit electronic money into the wallet, a settlement screen for the user to perform settlement, and the like. The display control unit 311 also performs transition of each screen based on operation of the user.

The storage unit 33 stores data of various screens to be displayed by the display control unit 311 on the display unit 35. The storage unit 33 is implemented by using an HDD, an SSD, or the like. The storage unit 33 includes a user information storage unit 131, a wallet information storage unit 132, a settlement information storage unit 133, and a store information storage unit 134, as needed.

The short-range wireless communication unit 34 has a communication function conforming to a standard such as near field radio communication (NFC), Bluetooth (registered trademark) low energy (BLE), or Infrared Data Association (IrDA), for example. For example, when performing electronic money payment, the user terminal 3 performs short-range wireless communication with the store terminal 4 through the short-range wireless communication unit 34.

The display unit 35 is implemented by using a liquid crystal display, an organic electroluminescent display (organic EL display), or the like, and displays various types of information and images under the control of the control unit 31.

The operation unit 36 is implemented by using a touch panel, a button, a switch, and the like, receives operation by the user, and outputs contents corresponding to the received operation to the control unit 31.

The image capturing unit 37 captures an image of a predetermined field of view and outputs the captured image (image data) to the control unit 31. The image capturing unit 37 is implemented by using one or more lenses and an image sensor such as a charge coupled device (CCD) sensor or a complementary metal oxide semiconductor (CMOS) sensor.

The position acquisition unit 38 acquires position information regarding a current position of the user terminal 3 (terminal position information) and outputs the acquired position information to the control unit 31. The position acquisition unit 38 is implemented by using a GPS sensor, receives signals from a plurality of GPS satellites and transmission antennas, and acquires the position information of the user terminal 3 based on the received signals.

Next, a configuration of the store terminal 4 will be described. The store terminal 4 is provided in a store (member store) where the wallet system 100 may be used. The store terminal 4 includes a control unit 41, a communication unit 42, a storage unit 43, and a short-range wireless communication unit 44. Since the control unit 41, the communication unit 42, the storage unit 43, and the short-range wireless communication unit 44 have configurations similar to those of the control unit 11, the communication unit 12, the storage unit 13, and the short-range wireless communication unit 34, detailed description thereof will be omitted.

Figure 3:
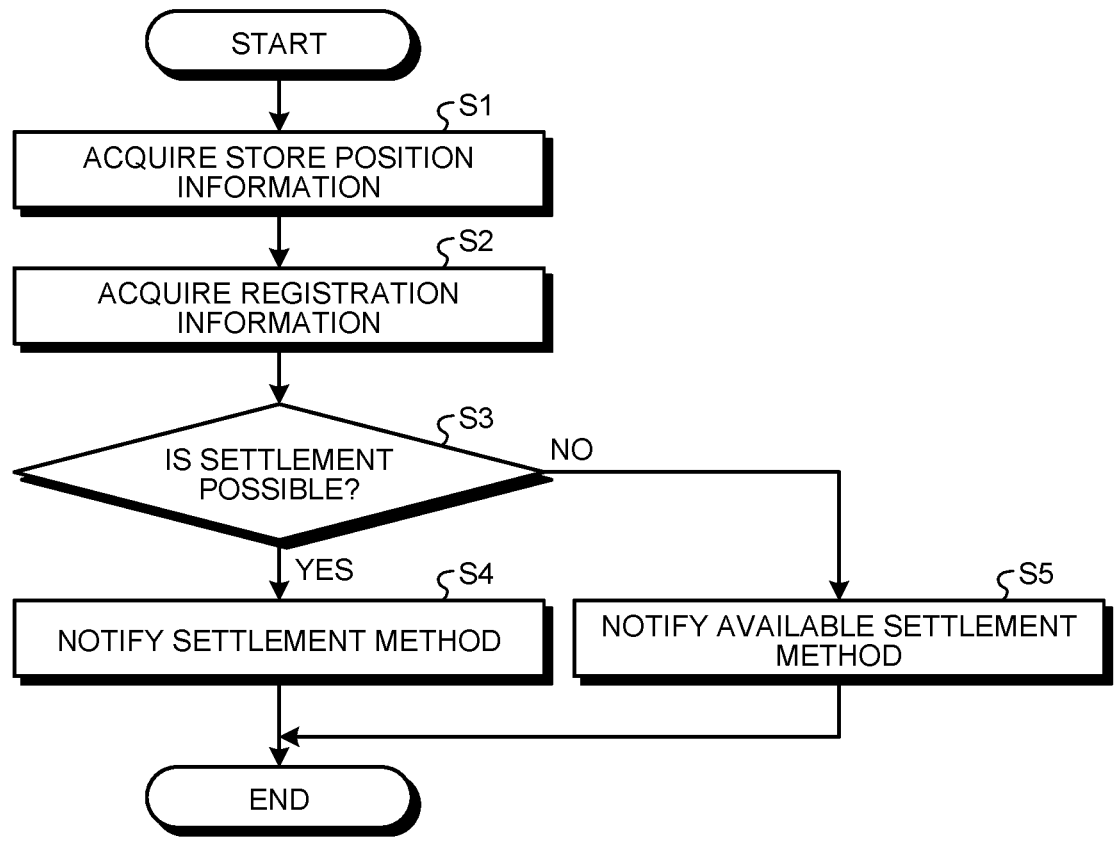
FIG. 3 is a flowchart illustrating an outline of processing executed by a wallet server according to the embodiment.

Next, processing executed by the wallet server 1 will be described. FIG. 3 is a flowchart illustrating an outline of the processing executed by the wallet server 1.

As illustrated in FIG. 3, the control unit 11 acquires store position information of a store where a user has entered (Step S1). Specifically, via the network NW, the control unit 11 acquires, as store position information, position information acquired by the position acquisition unit 38 of the user terminal 3. Here, the store position information is an address indicating a position of the store where the user has entered, a name of the store, and the like. Note that the control unit 11 may acquire, via the network NW, the store position information transmitted from a wireless communication device (for example, a device capable of Wi-Fi communication or Bluetooth (registered trademark) communication) or the like in the store where the user terminal 3 has entered to the user terminal 3. Furthermore, the control unit 11 may acquire, via the network NW, the store position information read by the image capturing unit 37 of the user terminal 3 from a two-dimensional code (for example, QR code (registered trademark)) provided in the store where the user has entered.

Thereafter, the control unit 11 acquires registration information indicating a plurality of settlement methods registered in the user terminal 3 (Step S2). Specifically, the control unit 11 acquires a user ID of the user terminal 3 and the registration information indicating the plurality of settlement methods registered in the user terminal 3 from the user information storage unit 131.

Subsequently, the control unit 11 determines, based on the registration information in the user terminal 3, whether or not settlement is possible by using any of the plurality of settlement methods registered in the user terminal 3 in the store where the user has entered (Step S3). When settlement is possible by using any of the plurality of settlement methods registered in the user terminal 3 in the store where the user has entered (Step S3: Yes), the wallet server 1 proceeds to Step S4 to be described later. On the other hand, when settlement is not possible by using any of the plurality of settlement methods registered in the user terminal 3 in the store where the user has entered (Step S3: No), the wallet server 1 proceeds to Step S5 to be described later.

Figure 4:
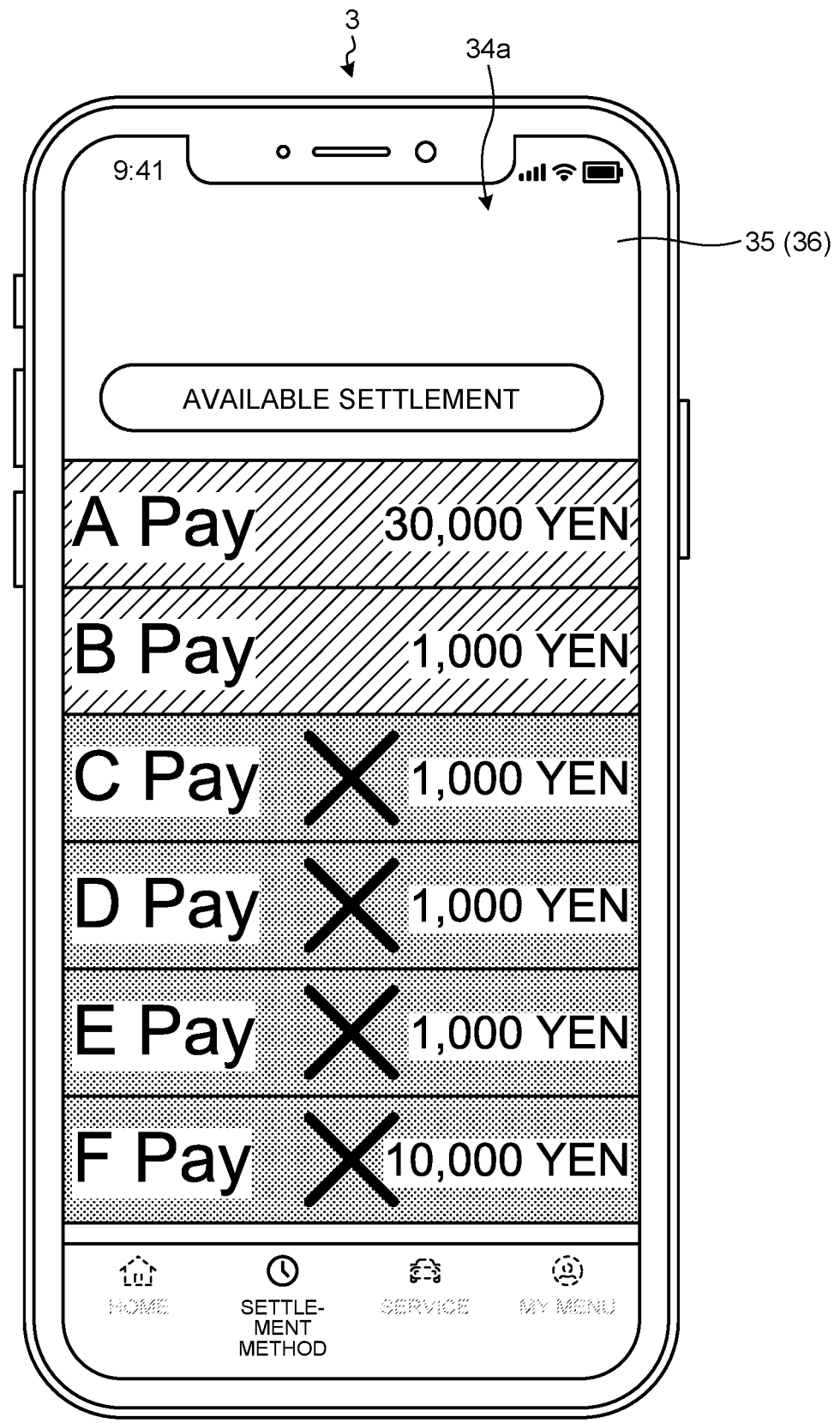
FIG. 4 is a diagram illustrating an example of a settlement screen displayed on a display unit by a display control unit of a user terminal according to the embodiment.

In Step S4, the control unit 11 notifies the user terminal 3 of a settlement method available in the store where the user has entered based on the store position information and settlement information. Specifically, as illustrated in FIG. 4, the control unit 11 notifies the user terminal 3 of the settlement method available in the store where the user has entered. In this case, as illustrated in FIG. 4, the display unit 35 of the user terminal 3 actively displays the settlement method available in the store where the user has entered on a settlement method selection screen 35*a*. Here, the active display means to highlight a character so as to stand out more than other characters by enlarging a font, changing a font, changing a font color, displaying a character, displaying an avatar, inverting a background color (highlighting) and the like. For example, in the case illustrated in FIG. 4, the display unit 35 of the user terminal 3 actively displays "A Pay" and "B Pay" under the control of the display control unit 311. Furthermore, as illustrated in FIG. 4, the display unit 35 of the user terminal 3 superimposes "X" on display areas of "C Pay" to "F Pay" and inactively displays the display areas of "C Pay" to "F Pay" under the control of the display control unit 311. Moreover, the display unit 35 of the user terminal 3 displays a balance of each settlement method under the control of the display control unit 311. Thus, the user may grasp the settlement method available in the store where the user has entered. Furthermore, the user may intuitively grasp the settlement method available in the store where the user has entered. After Step S4, the wallet server 1 ends this processing. Note that the control unit 11 may notify, based on user information and the registration information, the user terminal 3 of only a settlement method that is available in the store where the user has entered and most used in the user terminal 3 among the plurality of settlement methods registered in the user terminal 3. Needless to say, the control unit 11 may notify, based on the user information and the registration information, the user terminal 3 of only a settlement method that is available in the store where the user has entered and has the most balance among the plurality of settlement methods registered in the user terminal 3.

In Step S5, the control unit 11 notifies the settlement method available in the store where the user terminal 3 has entered based on the store position information and the settlement information. Thus, the wallet server 1 may make the user grasp the settlement method available in the store where the user has entered, and may invite the user to register the settlement method available in the store where the user has entered. After Step S5, the wallet server 1 ends this processing.

According to the embodiment described above, since the control unit 11 notifies the user terminal 3 of a settlement method available in a store where a user has entered based on store position information acquired from the user terminal 3 and store information stored in the store information storage unit 134 of the storage unit 13, the user may grasp the settlement method available in the store.

In addition, according to the embodiment, since the control unit 11 acquires registration information of one or more settlement methods registered in the user terminal 3, and notifies the user terminal 3 of the settlement method based on the registration information, the store position information, and the store information, the user may grasp the settlement method available among the settlement methods registered by the user.

In addition, according to the embodiment, since the control unit 11 notifies the settlement method available in the store where the user has entered based on the store information when settlement is not possible by using any of the plurality of settlement methods registered in the user terminal 3, the user may grasp the settlement method available in the store.

In addition, according to the embodiment, since the control unit 11 actively displays, on the user terminal 3, the settlement method available in the store where the user has entered when settlement is possible by using any of the plurality of settlement methods registered in the user terminal 3, the user may easily grasp the settlement method available in the store.

In addition, according to the embodiment, since the control unit 11 acquires, as the store position information, position information acquired by the position acquisition unit 38 of the user terminal 3, a position of the store where the user has entered may be grasped.

In addition, according to the embodiment, since the control unit 11 acquires the store position information transmitted from the store where the user has entered to the user terminal 3, the position of the store where the user has entered may be surely grasped.

In addition, according to the embodiment, since the control unit 11 acquires the store position information read by the user terminal 3 from two-dimensional information provided in the store where the user has entered, the position of the store where the user has entered may be surely grasped.

In addition, in the wallet system according to the embodiment, "unit" may be read as "circuit" or the like. For example, the control unit may be read as a control circuit.

In addition, a program executed by the wallet system according to the embodiment is provided as file data in an installable format or an executable format recorded on a computer-readable recording medium such as a CD-ROM, a flexible disk (FD), a CD-R, a digital versatile disk (DVD), a USB medium, or a flash memory.

In addition, the program executed by the wallet system according to the embodiment may be stored in a computer connected to a network such as the Internet and downloaded via the network to be provided.

Note that, in the description of the flowcharts in the present specification, expressions such as "first", "thereafter", and "subsequently" are used to clarify a relationship between processing of preceding and following steps, but the order of processing to implement the present embodiment is not uniquely determined by such expressions. That is, the order of processing in the flowcharts described in the present specification may be changed to the extent that no inconsistency occurs.

According to the present disclosure, there is an effect that electronic settlement available in a store may be grasped.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A server comprising
a processor comprising hardware, the processor being configured to:
  acquire store position information of a store where a user has entered, the store position information including at least an address indicating a position of the store and a name of the store, the store position information having been acquired from a terminal owned by the user, the terminal having received the store position information from at least one of a wireless communication device installed in the store and a two-dimensional code displayed in the store and captured by a camera of the terminal;
  acquire store information in which position information of each of a plurality of stores and one or more settlement methods available in each of the plurality of stores are associated;
  acquire registration information including a user ID of the terminal and a plurality of settlement methods registered in the terminal;
  acquire balance information for each of the settlement methods registered in the terminal;
  determine, based on the registration information, whether or not settlement is possible by using any of the plurality of settlement methods registered in the terminal in the store where the user has entered;
  notify the terminal of the settlement method available in the store where the user has entered based on the registration information, the store position information, and the store information when settlement is not possible by using any of the plurality of settlement methods registered in the terminal; and
  display, on the terminal, a list of all of the names of the settlement methods registered in the terminal such that a name of the settlement method available is emphasized in a manner more than any other name of one or more settlement methods that are not available in the store where the user has entered when there is one or more settlement methods registered in the terminal that are not possible to use for settlement in the store, the names of the settlement methods available being actively displayed on a same screen of the terminal as inactively displayed names of the one or more settlement methods that are not available along with the acquired balance information for each of the settlement methods registered in the terminal, the manner emphasized being at least one of enlarging a font of at least one character within the displayed name of the settlement method available, changing a font of at least one character within the displayed name of the settlement method available to a different font, displaying an additional character with the displayed name of the settlement method available, displaying an avatar with the displayed name of the settlement method available, and inverting a background color of the displayed name of the settlement method available.

2. The server according to claim 1, wherein the processor is configured to:
  acquire registration information of one or more settlement methods registered in the terminal; and
  notify the terminal of the settlement method available in the store where the user has entered based on the registration information, the store position information, and the store information.

3. The server according to claim 2, wherein the processor is configured to:
  determine, based on the registration information, whether or not settlement is possible by using any of the plurality of settlement methods registered in the terminal in the store where the user has entered, and
  notify the terminal of the settlement method available in the store where the user has entered based on the store information when settlement is not possible by using any of the plurality of settlement methods registered in the terminal.

4. The server according to claim 3, wherein the processor is configured to actively display, on the terminal, the settlement method available in the store where the user has entered when settlement is possible by using any of the plurality of settlement methods registered in the terminal.

5. The server according to claim 1, wherein
  the terminal includes a position acquisition unit configured to acquire terminal position information indicating a position of the terminal, and
  the processor is configured to acquire the terminal position information as the store position information.

6. The server according to claim 1, wherein the processor is configured to acquire the store position information transmitted from the store where the user has entered to the terminal.

7. The server according to claim 1, wherein the processor is configured to acquire the store position information read by the terminal from two-dimensional information provided in the store where the user has entered.

8. A wallet system comprising:
  a terminal comprising a first processor comprising hardware, the first processor being configured to acquire store position information of a store where a user has entered, the store position information including at least an address indicating a position of the store and a name of the store, the store position information having been received from at least one of a wireless communication device installed in the store and a two-dimensional code displayed in the store and captured by a camera of the terminal; and
  a server comprising a second processor comprising hardware, the second processor being configured to
    acquire the store position information form the terminal,
    acquire store information in which position information of each of a plurality of stores and one or more settlement methods available in each of the plurality of stores are associated,
    acquire registration information including a user ID of the terminal and a plurality of settlement methods registered in the terminal;
    acquire balance information for each of the settlement methods registered in the terminal;

determine, based on the registration information, whether or not settlement is possible by using any of the plurality of settlement methods registered in the terminal in the store where the user has entered;

notify the terminal of the settlement method available in the store where the user has entered based on the registration information, the store position information, and the store information when settlement is not possible by using any of the plurality of settlement methods registered in the terminal; and display, on the terminal, a list of all of the names of the settlement methods registered in the terminal such that a name of the settlement method available is emphasized in a manner more than any other name of one or more settlement methods that are not available in the store where the user has entered when there is one or more settlement methods registered in the terminal that are not possible to use for settlement in the store, the names of the settlement methods available being actively displayed on a same screen of the terminal as inactively displayed names of the one or more settlement methods that are not available along with the acquired balance information for each of the settlement methods registered in the terminal, the manner emphasized being at least one of enlarging a font of at least one character within the displayed name of the settlement method available, changing a font of at least one character within the displayed name of the settlement method available to a different font, displaying an additional character with the displayed name of the settlement method available, displaying an avatar with the displayed name of the settlement method available, and inverting a background color of the displayed name of the settlement method available.

9. The wallet system according to claim 8, wherein
the terminal includes a position acquisition unit configured to acquire terminal position information indicating a position of the terminal, and
the second processor is configured to acquire the terminal position information as the store position information.

10. The wallet system according to claim 8, wherein
the first processor is configured to acquire the store position information transmitted from the store where the user has entered, and
the second processor is configured to acquire the store position information transmitted from the store where the user has entered to the terminal.

11. The wallet system according to claim 8, wherein
the first processor is configured to acquire the store position information read from two-dimensional information provided in the store where user has entered, and
the second processor is configured to acquire the store position information from the terminal.

12. A non-transitory computer-readable recording medium on which an executable program is recorded, the program causing a processor of a computer to execute:
acquiring store position information of a store where a user has entered, the store position information including at least an address indicating a position of the store and a name of the store, the store position information having been acquired from a terminal owned by the user, the terminal having received the store position information from at least one of a wireless communication device installed in the store and a two-dimensional code displayed in the store and captured by a camera of the terminal;

acquiring store information in which position information of each of a plurality of stores and one or more settlement methods available in each of the plurality of stores are associated;

acquiring registration information including a user ID of the terminal and a plurality of settlement methods registered in the terminal;

acquiring balance information for each of the settlement methods registered in the terminal;

determining, based on the registration information, whether or not settlement is possible by using any of the plurality of settlement methods registered in the terminal in the store where the user has entered;

notifying the terminal of the settlement method available in the store where the user has entered based on the registration information, the store position information, and the store information when settlement is not possible by using any of the plurality of settlement methods registered in the terminal; and displaying, on the terminal, a list of all of the names of the settlement methods registered in the terminal such that a name of the settlement method available is emphasized in a manner more than any other name of one or more settlement methods that are not available in the store where the user has entered when there is one or more settlement methods registered in the terminal that are not possible to use for settlement in the store, the names of the settlement methods available being actively displayed on a same screen of the terminal as inactively displayed names of the one or more settlement methods that are not available along with the acquired balance information for each of the settlement methods registered in the terminal, the manner emphasized being at least one of enlarging a font of at least one character within the displayed name of the settlement method available, changing a font of at least one character within the displayed name of the settlement method available to a different font, displaying an additional character with the displayed name of the settlement method available, displaying an avatar with the displayed name of the settlement method available, and inverting a background color of the displayed name of the settlement method available.

13. The non-transitory computer-readable recording medium according to claim 12, wherein
the terminal includes a position acquisition unit that acquires terminal position information indicating a position of the terminal, and
the program causes the processor to execute acquiring the terminal position information as the store position information.

14. A method of notifying, the method comprising:
acquiring store position information of a store where a user has entered, the store position information including at least an address indicating a position of the store and a name of the store, the store position information having been acquired from a terminal owned by the user, the terminal having received the store position information from at least one of a wireless communication device installed in the store and a two-dimensional code displayed in the store and captured by a camera of the terminal;

acquiring store information in which position information of each of a plurality of stores and one or more settlement methods available in each of the plurality of stores are associated;

acquiring registration information including a user ID of the terminal and a plurality of settlement methods registered in the terminal;

acquiring balance information for each of the settlement methods registered in the terminal;

determining, based on the registration information, whether or not settlement is possible by using any of the plurality of settlement methods registered in the terminal in the store where the user has entered;

notifying the terminal of the settlement method available in the store where the user has entered based on the registration information, the store position information, and the store information when settlement is not possible by using any of the plurality of settlement methods registered in the terminal; and displaying, on the terminal, a list of all of the names of the settlement methods registered in the terminal such that a name of the settlement method available is emphasized in a manner more than any other name of one or more settlement methods that are not available in the store where the user has entered when there is one or more settlement methods registered in the terminal that are not possible to use for settlement in the store, the names of the settlement methods available being actively displayed on a same screen of the terminal as inactively displayed names of the one or more settlement methods that are not available along with the acquired balance information for each of the settlement methods registered in the terminal, the manner emphasized being at least one of enlarging a font of at least one character within the displayed name of the settlement method available, changing a font of at least one character within the displayed name of the settlement method available to a different font, displaying an additional character with the displayed name of the settlement method available, displaying an avatar with the displayed name of the settlement method available, and inverting a background color of the displayed name of the settlement method available.

\* \* \* \* \*